(12) United States Patent
Shim et al.

(10) Patent No.: US 8,957,146 B2
(45) Date of Patent: Feb. 17, 2015

(54) POLYAMIDE RESIN COMPOSITION WITH EXCELLENT REFLECTIVITY, HEAT RESISTANCE, AND WATER RESISTANCE

(71) Applicant: Cheil Industries Inc., Gumi-si (KR)

(72) Inventors: In Sik Shim, Uiwang-si (KR); Jong Cheol Lim, Uiwang-si (KR); Sun Ho Song, Uiwang-si (KR); Sang Hwa Lee, Uiwang-si (KR); Pil Ho Kim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/915,655

(22) Filed: Jun. 12, 2013

(65) Prior Publication Data

US 2013/0281587 A1    Oct. 24, 2013

Related U.S. Application Data

(63) Continuation-in-part of application No. PCT/KR2011/006328, filed on Aug. 26, 2011.

(30) Foreign Application Priority Data

Dec. 15, 2010  (KR) .................. 10-2010-0127984

(51) Int. Cl.
   *C08K 3/32*       (2006.01)
   *C09D 177/00*     (2006.01)
   *C08K 3/00*       (2006.01)
   *C08L 77/06*      (2006.01)
   *C09K 3/18*       (2006.01)
   *C08K 7/14*       (2006.01)
   *C08K 9/04*       (2006.01)

(52) U.S. Cl.
   CPC ............ *C09D 177/00* (2013.01); *C08K 3/0033* (2013.01); *C08K 3/32* (2013.01); *C08L 77/06* (2013.01); *C09K 3/18* (2013.01); *C08K 7/14* (2013.01); *C08K 9/04* (2013.01)
   USPC ........... 524/417; 524/414; 524/422; 524/423; 524/425; 524/430; 524/432; 524/437; 524/494; 524/497

(58) Field of Classification Search
   USPC ......... 524/422, 423, 425, 430, 432, 437, 494, 524/497, 417
   See application file for complete search history.

(56) References Cited

U.S. PATENT DOCUMENTS

| 4,177,185 A | 12/1979 | Tacke et al. | |
| 4,185,044 A | 1/1980 | Tacke et al. | |
| 5,256,718 A * | 10/1993 | Yamamoto et al. | 524/411 |
| 5,849,380 A | 12/1998 | Kashiba et al. | |
| 5,863,974 A * | 1/1999 | Tjahjadi et al. | 524/412 |
| 6,506,830 B1 | 1/2003 | Bussi et al. | |
| 8,178,608 B2 * | 5/2012 | Nakamura et al. | 524/417 |
| 8,304,481 B2 * | 11/2012 | Nakamura et al. | 524/451 |
| 8,426,549 B2 | 4/2013 | Ogasawara | |
| 2004/0102604 A1 | 5/2004 | Bassler et al. | |
| 2004/0175466 A1 | 9/2004 | Douglas et al. | |
| 2005/0113532 A1 | 5/2005 | Fish, Jr. et al. | |
| 2008/0146718 A1 | 6/2008 | Gijsman et al. | |
| 2009/0069479 A1 * | 3/2009 | Seki | 524/405 |
| 2010/0113656 A1 | 5/2010 | Saga | |
| 2010/0227957 A1 | 9/2010 | Fujii | |
| 2012/0165448 A1 | 6/2012 | Lee et al. | |
| 2012/0305287 A1 | 12/2012 | Ni | |
| 2013/0172453 A1 * | 7/2013 | Lee et al. | 524/100 |
| 2013/0281587 A1 | 10/2013 | Shim et al. | |

FOREIGN PATENT DOCUMENTS

| JP | 1995-228776 | 8/1995 |
| JP | 2000-204244 A | 7/2000 |
| JP | 2002-294070 A | 10/2002 |
| JP | 2004-075994 A | 3/2004 |
| JP | 2007-218980 | 8/2007 |
| KR | 10-2007-0093994 A | 9/2007 |
| KR | 2007-7026437 A | 12/2007 |
| WO | 03/085029 A1 | 10/2003 |
| WO | 2012/081801 A1 | 6/2012 |

OTHER PUBLICATIONS

International Search Report in counterpart International Application No. PCT/KR2011/006328 dated Apr. 4, 2012, pp. 1-4.
Full Translation of Higuchi et al. JP 2007-218980, pp. 1-32.
Office Action in commonly owned U.S. Appl. No. 13/728,177 mailed Oct. 23, 2013, pp. 1-7.
Office Action in commonly owned U.S. Appl. No. 13/728,177 mailed Feb. 10, 2014, pp. 1-13.
Office Action in commonly owned U.S. Appl. No. 13/332,788 mailed Nov. 28, 2012, pp. 1-8.
Final Office Action in commonly owned U.S. Appl. No. 13/332,788 mailed Jul. 25, 2013, pp. 1-12.
Office Action in commonly owned U.S. Appl. No. 14/067,139 mailed May 22, 2014, pp. 1-8.

* cited by examiner

*Primary Examiner* — Peter Szekely
(74) *Attorney, Agent, or Firm* — Additon, Higgins & Pendleton, P.A.

(57) ABSTRACT

A polyamide resin composition includes (A) polyamide resin, (B) white pigment, and (C) sodium phosphate salt.

10 Claims, No Drawings

POLYAMIDE RESIN COMPOSITION WITH EXCELLENT REFLECTIVITY, HEAT RESISTANCE, AND WATER RESISTANCE

CROSS-REFERENCE TO RELATED APPLICATIONS

This application is a continuation-in-part of International Application No. PCT/KR2011/006328, filed Aug. 26, 2011, pending, which designates the U.S., published as WO 2012/081801, and is incorporated herein by reference in its entirety, and claims priority therefrom under 35 USC Section 120. This application also claims priority under 35 USC Section 119 to and the benefit of Korean Patent Application No. 10-2010-0127984, filed Dec. 15, 2010, the entire disclosure of which is incorporated herein by reference.

FIELD OF THE INVENTION

The present invention relates to a polyamide resin composition that can have excellent reflectivity, impact strength, and water resistance.

BACKGROUND OF THE INVENTION

The history of nylon resin as an engineering plastic is close to 40 years, yet there still remains a high demand for the same. The continuing demand for nylon resin is due at least in part to the wide variety of types of nylon resin, such as PA 6, PA 66, PA 610, PA 612, PA 11, PA 12, PA6T, PA6I, PA9T, and the like, and copolymers or blends thereof, each of which has useful properties and various performance characteristics.

The mechanical properties and heat resistance of polyamide resin can be improved by adding inorganic reinforcing material such as glass fiber. Reinforced nylon resin compositions can be used in applications such as structural materials and interior and exterior parts of automobiles.

Recently, the demand for new light sources such as light emitting diodes (LEDs) and electro luminescence (EL) devices has increased as lighting, display and the like since these light sources can have low power consumption, long life times and the like.

High heat resistant modified nylon resin reinforced by glass fiber and having aromatic rings in the main chain of the modified nylon resin has been used as a material for the production of various LED components that can have excellent energy efficiency and energy lifespan, such as reflectors, reflector cups, scramblers, housings and the like. The resin can withstand high temperatures used in the production of LEDs, and also can exhibit excellent light reflectance with a high whiteness index, minimal deterioration of whiteness resulting from yellowing and can further block the flow of electricity.

Due to environmental regulation, lead-free solders, such as solders made of tin-silver alloy, are increasingly important. Lead-free solders generally have a higher melting point (around 260° C.) than conventional lead-containing solders. Examples of materials applicable in the lead-free solders are limited to liquid crystal polymer (LCP), polyphenylene sulfide (PPS) and heat resistance polyamide.

LEDs generally include a semiconductor emitting a light, a lead wire, a reflector as housing, and a transparent sealing product. The reflector can be made of various materials such as ceramic or heat resistant plastics. Ceramics, however, can have problems with productivity, and heat resistant plastics can have reduced optical light reflectance resulting from changes in color that can occur during the injection molding process, the curing process of the sealing product or actually use in the field.

SUMMARY OF THE INVENTION

The present invention provides a polyamide resin composition that can have excellent heat resistance. The polyamide resin composition can also have excellent water resistance. The present invention further provides a polyamide resin composition that can have excellent reflectivity. The polyamide resin composition can have excellent heat resistance and/or water resistance without impairing the reflectivity and mechanical property of the resin.

The polyamide resin composition of the present invention may comprise (A) about 100 parts by weight of polyamide resin, (B) about 0.1 to about 50 parts by weight of white pigment, and (C) about 0.01 to about 20 parts by weight of sodium phosphate salt.

The white pigment (B) may be titanium dioxide.

The sodium phosphate salt may be sodium acid pyrophosphate (SAPP).

The polyamide resin composition optionally may further comprise (D) filler in an amount about 0 (the filler is present) to about 80 parts by weight, based on about 100 parts by weight of the polyamide resin (A).

The filler (D) may be a glass fiber.

The polyamide resin composition of the present invention may have an initial light reflectivity measured by colorimeter at a wavelength of 440 nm of more than about 90 and a light reflectance reduction measured at a wavelength of 440 nm after the specimen is illuminated by a LED light source for 144 hours under a temperature of 85° C. and relative humidity of 85% of less than about 5.

The polyamide resin composition of the present invention may have a change of yellow index (ΔYI) measured after the specimen is illuminated by a LED light source for 144 hours under a temperature of 85° C. and relative humidity of 85% of less than about 3.

The present invention also provides an article which is prepared by the polyamide resin composition.

DETAILED DESCRIPTION OF THE INVENTION

The present invention now will be described more fully hereinafter in the following detailed description of the invention in which some but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention relates to a polyamide resin composition comprising (A) polyamide resin, (B) white pigment, and (C) sodium phosphate salt. The polyamide resin composition may comprise about 0.1 to about 50 parts by weight of white pigment (B) and about 0.01 to about 20 parts by weight of sodium phosphate salt (C) based on about 100 parts by weight of polyamide resin (A).

(A) Polyamide Resin

The aromatic polyamide resin (A) can include aromatic rings in the main chain thereof and may be produced by polycondensation of dicarboxylic acid including about 10 to about 100 mol % of an aromatic dicarboxylic acid and an aliphatic diamine, a cycloaliphatic diamine, or a combination thereof.

Examples of the aromatic dicarboxylic acids may include without limitation terephthalic acid (TPA) represented by the following Chemical Formula 1, isophthalic acid (IPA) represented by the following Chemical Formula 2, and the like, and combinations thereof.

[Chemical Formula 1]

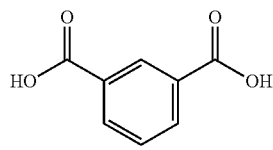

Terephthalic acid (TPA)

[Chemical Formula 2]

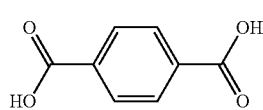

Isophthalic acid (IPA)

The aliphatic and/or the cycloaliphatic diamine can have about 4 to about 20 carbon atoms.

In exemplary embodiments, examples of the crystalline polyamide resin (A) include without limitation polyamide resins represented by Chemical Formula 3 below, such as but not limited to PA6T (m=6) produced by polycondensation of hexamethylene diamine and terephthalic acid, PA10T (m=10) produced by polycondensation of 1,10-decane diamine and terephthalic acid, and the like, and combinations thereof:

[Chemical Formula 3]

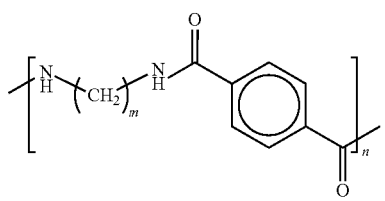

wherein, m is an integer ranging from 4 to 12 and n is an integer ranging from 50 to 500.

Other examples of the crystalline polyamide resin (A) which can have a melting point of more than about 150° C. comprise without limitation polytetramethylene adipaimde (PA46), polycaproamide/polyhexamethylene terephthalamide copolymer (PA6/6T), polyhexamethylene adipamide/polyhexamethylene terephthalamide copolymer (PA66/6T), polyhexamethylene adipamide/polyhexamethylene isophthalamide copolymer (PA66/6I), polyhexamethylene terephthalamide/polyhexamethylene isophthalamide copolymer (PA6T/6I), polyhexamethylene terephthalamide/polydodecanamide copolymer (PA6T/12), polyhexamethylene adipamide/polyhexamethylene terephthalamide/polyhexamethylene isophthalamide copolymers (PA66/6T/6I), polyxylene adipamide (PA MXD6), polyhexamethylene terephthalamide/poly(-2-methylpentamethylene terephthalamide) copolymers (PA 6T, PAM5T), polynonamethylene terephthalamide (PA9T), polydecamethylene terephthalate (PA10T), and the like, and combinations thereof.

(B) White Pigment

The polyamide resin composition of the present invention may comprise a white pigment (B) to minimize the yellowing and impart good light reflectance.

Examples of the white pigment (B) may include without limitation titanium oxide, zinc oxide, zinc sulfide, white lead, zinc sulfate, barium sulfate, calcium carbonate, aluminum oxide and the like. The white pigment may be used alone or in combinations thereof.

Further, the white pigment may be surface treated with a coupling agent, such as a silane coupling agent, titanium coupling agent, and the like, and combinations thereof. Examples of the coupling agent may include without limitation vinyltriethoxysilane, 2-aminopropyltriethoxysilane, 2-glycidoxypropyltriethoxysilane, and the like, and combinations thereof.

In exemplary embodiments, the white pigment may be titanium dioxide ($TiO_2$), which can improve optical properties such as light reflectance and hiding properties. Any conventional titanium dioxide may be used for the titanium dioxide of the present invention. The titanium dioxide is not limited to any particular method of making the same, and conventional preparation methods may be used. Further, the titanium dioxide of the present invention is not limited by particle size.

In exemplary embodiments, titanium dioxide treated by an inorganic or organic surface treatment agent can be used. Examples of the inorganic surface treatment agent can include without limitation aluminum oxide (alumina, $Al_2O_3$), silicon dioxide (silica, $SiO_2$), zircon dioxide (zirconia, $ZrO_2$), sodium silicate, sodium aluminate, sodium aluminosilicate, zinc oxide, mica and the like. The inorganic surface treatment agent may be used alone or in combinations thereof. Examples of the organic surface treatment agent can include without limitation polydimethylsiloxane, trimethylpropane (TMP), pentaerythritol and the like. The organic surface treatment agent may be used alone or in combinations thereof.

The titanium dioxide may be coated with less than about 0.3 parts by weight of the inorganic or organic surface treatment agent, based on about 100 parts by weight of titanium dioxide. In exemplary embodiments, the titanium dioxide may be coated with less than about 5 parts by weight of alumina as an inorganic surface treatment agent, based on about 100 parts by weight of titanium dioxide.

The titanium dioxide coated by the alumina can be further coated by another inorganic surface treatment agent such as but not limited to silicon dioxide, zircon dioxide, sodium silicate, sodium aluminate, sodium aluminosilicate, mica and the like and combinations thereof, and/or an organic surface treatment agent such as but not limited to polydimethylsiloxane, trimethylpropane (TMP), pentaerythritol and the like, and combinations thereof.

The polyamide resin composition of the present invention may comprise the white pigment (B) in an amount of about 0.1 to about 50 parts by weight, for example, about 5 to about 30 parts by weight, based on about 100 parts by weight of the aromatic polyamide resin (A).). In some embodiments, the polyamide resin composition can include the white pigment (B) in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the white pigment (B) may be present in an amount of from about any of the foregoing amounts to about any other of the foregoing amounts.

When the amount of the white pigment (B) is less than about 0.1 parts by weight, the light resistance may be deteriorated. When the amount of the white pigment (B) is more than about 50 parts by weight, the impact resistance may be deteriorated.

(C) Sodium Phosphate Salt

The polyamide resin composition of the present invention may comprise a sodium phosphate salt (C) to impart good light reflectance as well as heat resistance, water resistance and light stability of the polyamide resin composition. When using both the white pigment (B) and the sodium phosphate salt (C), the polyamide resin composition may have good whiteness as well as heat resistance and water resistance. The polyamide resin composition may have good light reflectance since the sodium phosphate salt (C) can have excellent whiteness. Also, the polyamide resin composition may have good heat resistance and water resistance since the polyamide resin composition comprises the sodium phosphate salt (C) which can have good heat resistance and water resistance.

Examples of the sodium phosphate salt (C) can include without limitation sodium monohydrogen phosphate, sodium dihydrogen phosphate, sodium phosphate, sodium acid pyrophosphate, sodium pyrophosphate, and the like, and combinations thereof. The sodium phosphate salt (C) may be used alone or in combinations thereof.

Also, the sodium phosphate salt (C) can eliminate acid which may be generated in the molding process using the polyamide resin composition, so that thermo-discoloration stability and hydrolysis stability can be improved.

The sodium phosphate salt (C) is not limited by particle size. The sodium phosphate salt can be treated with surface treatment agent to improve compatibility thereof with the polyamide resin and the dispersion of the sodium phosphate salt in the polyamide resin matrix.

Examples of surface treatment agents can include without limitation silane coupling agents such as silane, epoxy silane and the like, titanium coupling agents, organic acids, polyols, silicones and the like, and combinations thereof.

The polyamide resin composition of the present invention may comprise the sodium phosphate salt (C) in an amount of about 0.01 to about 20 parts by weight, for example about 2 to about 10 parts by weight, based on about 100 parts by weight of the aromatic polyamide resin (A). In some embodiments, the polyamide resin composition can include the sodium phosphate salt (C) in an amount of 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20 parts by weight. Further, according to some embodiments of the present invention, the sodium phosphate salt (C) may be present in an amount of from about any of the foregoing amounts to about any other of the foregoing amounts.

When the amount of the sodium phosphate salt (C) is less than about 0.01 parts by weight, the light reflectance of the resin composition may be deteriorated. When the amount of sodium phosphate salt (C) is more than about 20 parts by weight, the impact strength and yellowing resistance of the resin composition may be deteriorated.

(D) Fillers

The polyamide resin composition of the present invention may optionally comprise an inorganic filler (D) in various forms, such as but not limited to fiber, powder, particle, flake, needle, cloth, mat, and the like, and combinations thereof, in order to improve mechanical properties, heat resistance and dimensional stability of the resin composition.

The polyamide resin composition of the present invention may comprise the filler (D) in an amount of about 0.01 to about 80 parts by weight, based on about 100 parts by weight of the aromatic polyamide resin (A). In some embodiments, the polyamide resin composition can include filler in an amount of 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 parts by weight. Further, according to some embodiments of the present invention, the filler may be present in an amount of from about any of the foregoing amounts to about any other of the foregoing amounts.

In the present invention, any conventional organic and/or inorganic filler can be used. Exemplary organic and/or inorganic filler (D) includes without limitation carbon fiber, glass fiber, boron fiber, glass bead, glass flake, carbon black, diatomaceous earth, clay, kaolin, talc, mica, calcium carbonate, filler in needle form, and the like, and combinations thereof. Examples of filler in needle form include without limitation glass fiber, wollastonite, potassium titanate whisker, aluminum boric acid whisker, zinc oxide whisker, calcium whisker, and the like, and combinations thereof.

In exemplary embodiments, glass fiber can be used. By using the glass fiber, formability of composition can be improved and mechanical properties such as tensile strength, bending strength, and elasticity of the formed product from resin composition can be improved. The average length of the glass fiber is generally in a range of about 0.1 to about 20 mm, for example, in a range of about 0.3 to about 10 mm. The aspect ratio of glass fiber [L (average length of fiber)/D (average diameter of fiber)] is generally in a range of about 10 to about 2,000, for example, in a range of about 30 to about 1,000.

Also, needle-shaped fillers can be used to obtain an article with high surface smoothness.

In exemplary embodiments, to provide a high degree of whiteness, glass fiber, wollastonite, calcium titanate whisker, aluminum borate whisker, and combinations thereof can be used.

The cross section of the glass fiber can be varied other than round shape according to the end use. In the present invention, any kind of cross sectional shape of glass fiber can be used.

The polyamide resin composition of the present invention may further comprise one or more additive(s) such as but not limited to UV stabilizers, fluorescence brightening agents, lubricants, release agents, nucleating agents, antistatic agents, stabilizers, reinforcing materials, inorganic additives, colorants such as dyes and/or pigments, and the like, and combinations thereof. The additive(s) can be used in conventional amounts, so long as the additives do not significantly compromise other desired properties of the resin composition. The skilled artisan can readily select the types and amounts of additives without undue experimentation depending on the use of the compositions and the desired additional properties thereof.

The UV stabilizers may play a role of restricting the color changes and light reflectivity reduction of resin composition following UV irradiation. Exemplary UV stabilizers include without limitation benzotriazole, benzophenon, triazine, and the like, and combinations.

The fluorescence brightening agents may play a role of enhancing light reflectance of the polyamide resin composition. Exemplary fluorescence brightening agents include without limitation stilbene-bis benzoxazole derivatives such as 4-(2-benzoxazolyl)-4'-(5-methyl-2-benzoxazolyl)stilbene, 4,4'-bis(2-benzoxazolyl)stilbene, and the like, and combinations thereof.

Exemplary release agents include without limitation polymers containing fluorine, silicone oils, metal salts of stearic acid, metal salts of montanic acid, ester waxes of montanic acid, polyethylene waxes, and the like, and combinations thereof.

Exemplary nucleating agents include without limitation talc, clay, and the like, and combinations thereof.

The polyamide resin composition of the present invention may have an initial light reflectivity measured by colorimeter at a wavelength of 440 nm of more than about 90 and a light reflectance reduction measured at a wavelength of 440 nm after the specimen is illuminated by a LED light source for 144 hours under a temperature of 85° C. and relative humidity of 85% of less than about 5. The polyamide resin composition of the present invention may have a change of yellow index ($\Delta$YI) measured after the specimen is illuminated by a LED light source for 144 hours under a temperature of 85° C. and relative humidity of 85% of less than about 3. The polyamide resin composition further can have an Izod impact strength of more than about 2 kgf/cm$^2$ measured in accordance with ASTM D256 using a specimen with a thickness of ⅛ inch.

Accordingly, the polyamide resin composition of the present invention can be used in articles requiring good heat resistance and water resistance. Further, the polyamide resin composition of the present invention can exhibit excellent light reflectance and impact strength by including proper amounts of the white pigment (B) and sodium phosphate salt (C), and also heat resistance and water resistance may also be improved with minimal decline in the light reflectance and minimal yellowing exhibited by the composition after exposure to the proceeding constant temperature and constant humidity (i.e., 85° C. and 85% of relative humidity). Therefore, the polyamide resin composition of the present invention can be used as a LED reflector material which is continuously exposed to a high temperature and high humidity environment.

The polyamide resin composition of the present invention can be adapted not only for LED applications, but also for other applications reflecting light beams. For example, it is possible to use the polyamide resin composition as a material for a reflector for a light emitting device such as various electrical/electronic products, indoor lighting, indicators, outdoor lighting, automobile lighting, display apparatus, headlights, and the like.

The invention may be better understood by reference to the following examples which are intended for the purpose of illustration and are not to be construed as in any way limiting the scope of the present invention, which is defined in the claims appended hereto.

EXAMPLES

The specifications of (A) polyamide resin, (B) white pigment, (C) sodium phosphate salt, and (D) fillers are as below.

(A) Polyamide Resin (A$_1$) Polyamide Resin (PA10T)

In the examples exemplifying the present invention and comparative examples, high heat resistant modified nylon (PA 10T) in which benzene rings are included in the main chain prepared by polycondensation with terephthalic acid and 1,10 decane diamine is used.

(A$_2$) Polyamide Resin (PA6T)

In the examples exemplifying the present invention and comparative examples, high heat resistant modified nylon (PA6T) in which benzene rings are included in the main chain prepared by polycondensation with terephthalic acid and hexamethylene diamine is used.

(B) White Pigment

The titanium dioxide which is used in the examples exemplifying the present invention and comparative examples is Kronos 2233® from KRONOS.

(C) Sodium Phosphate Salt

The sodium phosphate which is used in the examples exemplifying the present invention and comparative examples is sodium acid pyrophosphate from Innophos.

(D) Fillers

The glass fiber 910 from VETROTEX INTERNATIONAL is used in the examples exemplifying the present invention and comparative examples.

Examples 1 to 6 and Comparative Examples 1 to 3

The components in amounts shown in the following Table 1 are extruded through a conventional extruder heated about 240 to about 350° C. and pellets for resin composition are prepared. After drying the prepared pellets at a temperature of 130° C. for more than 5 hours, a specimen is prepared using an injection molding machine heated about 240 to about 330° C.

TABLE 1

| | Examples | | | | | | Comparative Examples | | |
|---|---|---|---|---|---|---|---|---|---|
| | 1 | 2 | 3 | 4 | 5 | 6 | 1 | 2 | 3 |
| (A$_1$) | 100 | 100 | 100 | 100 | 100 | — | 100 | 100 | 100 |
| (A$_2$) | — | — | — | — | — | 100 | — | — | — |
| (B) | 15 | 15 | 30 | 30 | 30 | 30 | 15 | — | — |
| (C) | 0.5 | 2 | 2 | 2 | 10 | 2 | — | 2 | — |
| (D) | 20 | 20 | 20 | — | — | 20 | 20 | 20 | 20 |

Physical properties are measured by the following method and the results are shown in Table 2:

(1) Hear resistance (HDT, ° C.): The HDT is measured in accordance with ASTM D648 using a specimen with a thickness of ¼ inch under a pressure of 1.82 MPa.

(2) Light reflectance (%): Initial light reflectance (SCI, specular component included) at a wavelength of 440 nm is measured according to CIE Lab color difference evaluation criteria using a Minolta 3600D spectrophotometer, and then light reflectance is measured again after maintaining the specimen under conditions temperature of 85° C. and 85% relative humidity for 144 hours. The reduction in light reflectance is evaluated.

(3) Yellow index (YI): Initial yellow index is measured according to CIE Lab color difference evaluation criteria using a Minolta 3600D spectrophotometer, and then is measured again after maintaining the specimen under conditions of 85° C. and 85% relative humidity for 144 hours. The change of yellow index ($\Delta$YI) is evaluated.

(4) Izod impact strength (kgf·cm/cm): The Izod impact strength is measured in accordance with ASTM D256 using a specimen with a thickness of ⅛ inch.

TABLE 2

|  |  | Examples | | | | | | Comparative Examples | | |
|---|---|---|---|---|---|---|---|---|---|---|
|  |  | 1 | 2 | 3 | 4 | 5 | 6 | 1 | 2 | 3 |
|  | HDT | 271 | 272 | 275 | 260 | 270 | 300 | 270 | 269 | 255 |
| Light reflectance | Initial | 91.4 | 91.5 | 92.2 | 92.5 | 92.4 | 90.5 | 91.5 | 42.3 | 39.5 |
|  | After 144 hours | 89.0 | 89.2 | 90.3 | 91.2 | 90.1 | 88.0 | 70.1 | 21.3 | 19.0 |
|  | Change of light reflectance | 2.4 | 2.3 | 1.9 | 1.3 | 1.3 | 2.5 | 21.4 | 21.0 | 20.5 |
| YI | Initial | 3.7 | 4.0 | 2.7 | 3.9 | 3.9 | 3.5 | 3.4 | 14.3 | 15.3 |
|  | After 144 hours | 5.2 | 4.2 | 3.5 | 4.4 | 4.1 | 5.0 | 13.8 | 26.5 | 37.9 |
|  | Change of YI | 1.5 | 0.2 | 0.8 | 0.5 | 0.2 | 1.5 | 10.4 | 12.2 | 22.6 |
| Izod impact strength |  | 3.1 | 3.1 | 3.3 | 2.5 | 2.5 | 3.4 | 3.2 | 3.4 | 1.8 |

From the results as in the above Table 2, it is clear that the polyamide resin compositions of examples 1-6 have excellent reflectivity and yellowing resistance while not impairing the heat resistance and impact strength. When titanium and sodium phosphate salt (C) are not used together, or not used within the range of the present invention, reflectivity and yellowing resistance are decreased. In comparative example 1 wherein sodium phosphate salt (C) is not used, comparative example 2 wherein titanium dioxide is not used, and comparative example 3 wherein both the titanium dioxide and sodium phosphate are not used, reflectivity as well as yellowing resistance is impaired.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A polyamide resin composition comprising (A) polyamide resin, (B) about 0.1 to about 50 parts by weight of white pigment, and (C) about 0.01 to about 20 parts by weight of sodium phosphate salt, each based on about 100 parts by weight of polyamide resin (A), wherein the polyamide resin composition has an initial light reflectivity measured by colorimeter at a wavelength of 440 nm of more than about 90, a light reflectance reduction measured at a wavelength of 440 nm after a specimen is illuminated by a LED light source for 144 hours under a temperature of 85° C. and relative humidity of 85% of less than about 5, and a change of yellow index (ΔYI) measured after a specimen is illuminated by a LED light source for 144 hours under a temperature of 85° C. and relative humidity of 85% of less than about 3.

2. The polyamide resin composition of claim 1, wherein the polyamide resin (A) includes aromatic dicarboxylic acid and aliphatic diamine, cycloaliphatic diamine, or a combination thereof as repeating units.

3. The polyamide resin composition of claim 1, wherein the polyamide resin (A) has a melting point of more than 150° C. and is represented by following Chemical formula 3:

[Chemical Formula 3]

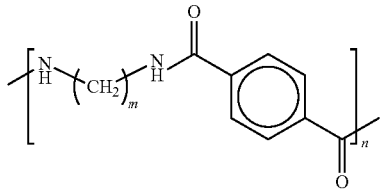

wherein, m is an integer ranging from 4 to 12 and n is an integer ranging from 50 to 500.

4. The polyamide resin composition of claim 1, wherein the white pigment (B) comprises titanium oxide, zinc oxide, zinc sulfide, lead white, zinc sulfate, barium sulfate, calcium carbonate, aluminum oxide, or a combination thereof.

5. The polyamide resin composition of claim 1, wherein the sodium phosphate salt (C) comprises sodium phosphate monobasic, sodium phosphate dibasic, sodium phosphate, sodium acid pyrophosphate, or a combination thereof.

6. The polyamide resin composition of claim 5, wherein the sodium phosphate salt (C) is surface-treated with a silane coupling agent, titanium coupling agent, organic acid, polyol, or silicone.

7. The polyamide resin composition of claim 1, wherein the polyamide resin composition further comprises about 0.01 to about 80 parts by weight of filler (D).

8. The polyamide resin composition of claim 7, wherein the filler (D) includes glass fiber having an average length of about 0.1 to about 20 mm and an aspect ratio of about 10 to about 2,000.

9. The polyamide resin composition of claim 1, wherein the polyamide resin has an Izod impact strength of more than about 2 kgf/cm².

10. An article prepared from the polyamide resin composition of claim 1.

* * * * *

UNITED STATES PATENT AND TRADEMARK OFFICE
CERTIFICATE OF CORRECTION

PATENT NO. : 8,957,146 B2
APPLICATION NO. : 13/915655
DATED : February 17, 2015
INVENTOR(S) : In Sik Shim et al.

It is certified that error appears in the above-identified patent and that said Letters Patent is hereby corrected as shown below:

In the Specification

Column 3, Line 62, reads: "ene isophthalamide copolymers (PA66/6T/6I), polyxylene"
and should read: "ene isophthalamide copolymers (PA66/6T/6I), polyxylene"

Signed and Sealed this
Second Day of February, 2016

Michelle K. Lee
*Director of the United States Patent and Trademark Office*